United States Patent
Monreal Lesmes et al.

(10) Patent No.: US 10,767,624 B2
(45) Date of Patent: Sep. 8, 2020

(54) APPARATUS FOR JOINING A MODULAR BLADE

(71) Applicant: NABRAWIND TECHNOLOGIES SL, Pamplona (ES)

(72) Inventors: Javier Monreal Lesmes, Zizur Mayor (ES); Javier Callén Escartín, Huesca (ES); Ion Arocena De La Rúa, Pamplona (ES); Hely Ricardo Savii Costa, Uterga (ES); Eneko Sanz Pascual, Pamplona (ES)

(73) Assignee: NABRAWIND TECHNOLOGIES SL, Pamplona (ES)

( * ) Notice: Subject to any disclaimer, the term of this patent is extended or adjusted under 35 U.S.C. 154(b) by 149 days.

(21) Appl. No.: 16/150,862

(22) Filed: Oct. 3, 2018

(65) Prior Publication Data
US 2019/0032634 A1 Jan. 31, 2019

Related U.S. Application Data

(63) Continuation-in-part of application No. PCT/ES2016/000042, filed on Apr. 4, 2016.

(51) Int. Cl.
*F03D 1/06* (2006.01)
*F16B 31/04* (2006.01)
*F16B 2/14* (2006.01)

(52) U.S. Cl.
CPC ......... *F03D 1/0675* (2013.01); *F03D 1/0633* (2013.01); *F05B 2230/60* (2013.01);
(Continued)

(58) Field of Classification Search
CPC .. F03D 1/0675; F03D 1/0633; F05B 2230/60; F05B 2240/21; F05B 2240/302; F05B 2260/301
See application file for complete search history.

(56) References Cited

U.S. PATENT DOCUMENTS

| | | | |
|---|---|---|---|
| 7,481,624 B2 * | 1/2009 | Wobben | B64C 27/46 416/132 B |
| 8,376,713 B2 * | 2/2013 | Kawasetsu | F03D 1/0675 416/226 |

(Continued)

FOREIGN PATENT DOCUMENTS

| | | |
|---|---|---|
| DE | 3109566 A1 | 10/1982 |
| WO | 2013117911 A1 | 8/2013 |

(Continued)

OTHER PUBLICATIONS

International Search Report in Corresponding International Application No. PCT/ES2016/000042, dated Jul. 7, 2016.
(Continued)

*Primary Examiner* — Brian P Wolcott
(74) *Attorney, Agent, or Firm* — Edell, Shapiro & Finnan, LLC

(57) ABSTRACT

An assembly for joining together modules of a modular wind turbine blade. According to one embodiment the assembly is formed by a plurality of bolts that are secured between pairs of first and second inserts respectively housed in the composite material of first and second modules. According to one embodiment each assembly is formed by first and second lateral caps, upper wedge and a lower wedges located between the first and second lateral caps, and transverse screws joining the upper and lower wedges that together are formed around the corresponding bolt. When a force F1 is applied to the wedges, the lateral caps respond with forces $F_2$ that urge the first and second modules away from one another to longitudinally stress the bolt.

11 Claims, 5 Drawing Sheets

(52) U.S. Cl.
CPC ..... *F05B 2240/21* (2013.01); *F05B 2240/302* (2013.01); *F05B 2260/301* (2013.01); *F16B 2/14* (2013.01); *F16B 31/04* (2013.01)

(56) References Cited

U.S. PATENT DOCUMENTS

| | | | |
|---|---|---|---|
| 8,510,947 B2* | 8/2013 | Kirkpatrick | B23P 15/04 |
| | | | 29/889.71 |
| 9,797,369 B2* | 10/2017 | Kratmann | F03D 1/0633 |
| 10,132,291 B2* | 11/2018 | Garm | F03D 1/0658 |
| 10,584,677 B2* | 3/2020 | Sanz Pascual | F03D 1/06 |
| 2006/0083611 A1 | 4/2006 | Wobben | |
| 2008/0080946 A1* | 4/2008 | Livingston | F03D 13/10 |
| | | | 411/54.1 |
| 2012/0263545 A1* | 10/2012 | Oestergaard | E04H 12/34 |
| | | | 405/227 |
| 2014/0271210 A1* | 9/2014 | Montejo Yuste | F16B 5/0084 |
| | | | 416/204 R |
| 2015/0292477 A1 | 10/2015 | Kratmann et al. | |
| 2019/0338750 A1* | 11/2019 | Bech | F03D 1/0675 |

FOREIGN PATENT DOCUMENTS

| | | | | |
|---|---|---|---|---|
| WO | WO-2013117911 A1 * | 8/2013 | | F16B 31/043 |
| WO | 2015181401 A1 | 12/2015 | | |

OTHER PUBLICATIONS

Extended European Search Report received in EP Application No. 16897792.4, dated Oct. 10, 2019 (8 pages).

* cited by examiner

APPARATUS FOR JOINING A MODULAR BLADE

CROSS-REFERENCE TO RELATED APPLICATIONS

This application relates to and claims the benefit and priority to International Application No. PCT/ES2016/000042, filed Apr. 4, 2016.

FIELD

The current invention relates to the field of wind turbine fields and more specifically to a method and apparatus for joining the modules of modular blades.

BACKGROUND

International Publication No. WO2015181401 from the same applicant as the current application discloses a joint of a modular blade where the modules are fixed using various bolts between primary and secondary metal inserts. Once each bolt is threaded in its inserts, the bolt must be stressed, taking into account how little space there is between the two blade modules. WO2015181401 discloses various solutions that include both stretching the bolt initially and to maintain this stretching or pre-stressing using spacers placed at intervals.

SUMMARY OF THE DISCLOSURE

Mechanically joining first and second modules of a wind turbine blade is provided using a group of bolts that are each threaded with a set of first and second inserts respectively located in the first and second modules. A wedge is located in a gap formed between the blade modules as a simple device that produces two opposing horizontal forces on the bolts. The wedge ultimately fills the gap and forms part of the wind turbine blade.

As the result of using wedges to longitudinally stress the bolts, a simple mechanical action can be applied individually by each of the wedges to a joint comprising a single bolt. Each of the joints may further comprise first and second lateral caps having disposed between them an upper wedge and a lower wedge. The upper and lower wedges are joined by transverse bolts that are preferably arranged orthogonal to the single bolt that is attached to the first and second inserts. Each of the wedges has at least one inclined side surface that abuts against a side surface of at least one of the lateral caps.

The wedges are configured to transforms an applied vertical force, either through the transverse bolts or through an external force applied directly to the wedges, into two opposing horizontal forces to the bolts that are attached to the first and second inserts. The angle of the inclined side surfaces of the wedges determines the ratio between the vertical forces applied to the wedges and the resulting horizontal forces applied to the bolts that are attached to the first and second inserts due to the decomposition of forces in the inclined plane.

As a result, the joint is mounted simply and can easily reach the necessary stressing. This is achieved due to the force-multiplying effect obtained with the wedges that is able to convert a vertically applied force into much larger horizontal forces. This enables the parts of the joints to be endowed with great compression stiffness so that they behave like rigid solid objects, allowing a much more robust geometric control of the preload than in systems with flexible elements placed at intervals.

With the joint systems disclosed herein the required stressing is obtained in the main bolt, allowing a suitable distribution of the fatigue loads and therefore ensuring the useful life of the bolt.

It is also important to note that the transverse bolts passing through the wedges receive almost no fatigue loads due to the fact that friction on the inclined planes of the wedges prevent displacement.

The joint systems disclosed and contemplated herein result in a lower probability of loss of stress than in traditional systems, both due to the abovementioned low loads and due to the simple fact that various elements of the joint systems are arranged parallel to each other for the application of the stress.

For this reason, the joint systems disclosed herein do not need to be restressed during its service life and will be maintenance-free. This is a large advantage over prior art methods of joining modules of a wind turbine blade.

In summary, the joint configurations disclosed herein allows for stressing of the bolts that are attached to the first and second inserts with less application force and more precision than current systems.

BRIEF DESCRIPTION OF THE DRAWINGS

Below is a brief description of a series of drawings useful for a better understanding the various embodiments of the apparatus and methods disclosed herein.

DETAILED DESCRIPTION

Figure 1:
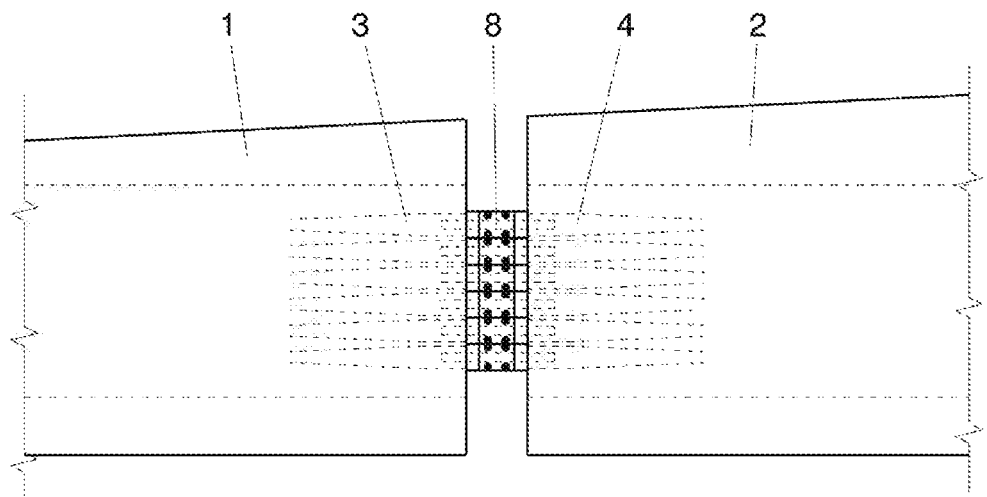
FIG. 1 is a general view of a modular blade joint according to one embodiment.

FIG. 1 generally illustrates a first module 1 and a second module 2 of a wind turbine blade being joined by a joint system. The joint system includes a plurality of first inserts 3 located in the first module 1 and a plurality of second inserts 4 located inside the second module 2.

During the manufacturing process the first inserts 3 and second inserts 4 are each housed inside the composite material 5 that makes up the respective first and second modules. Each pair of first and second inserts is then coupled by a single bolt 8.

Figure 2:
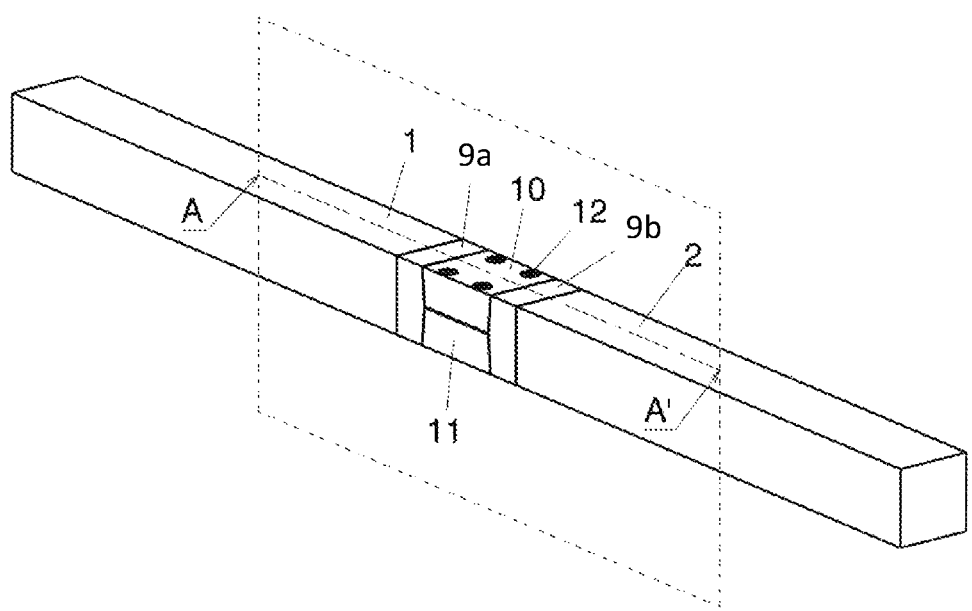
FIG. 2 is a perspective view of a single joint device according to one embodiment.

FIG. 2 shows a single joint assembly that includes a bolt 8 (hidden in FIG. 2) and is positioned inside the gap between the first and second modules 1 and 2. In the embodiment of FIG. 2 the joint assembly includes first and second lateral caps 9a and 9b and also upper and lower wedges 10 and 11. Lateral cap 9a has a first face 16a in contact with the first insert 3 and a second face 17a opposite the first face 16a that is in contact with a first inclined surface 18a and 19a of the respective upper and lower wedges 10 and 11. Lateral cap 9b has a first face 16b in contact with the second insert 4 and a second face 17b opposite the first face 16b that is in contact with a second inclined surface 18b and 19b of the respective upper and lower wedges 10 and 11. Wedges 10 and 11 are joined by transverse bolts 12.

Figure 3A:
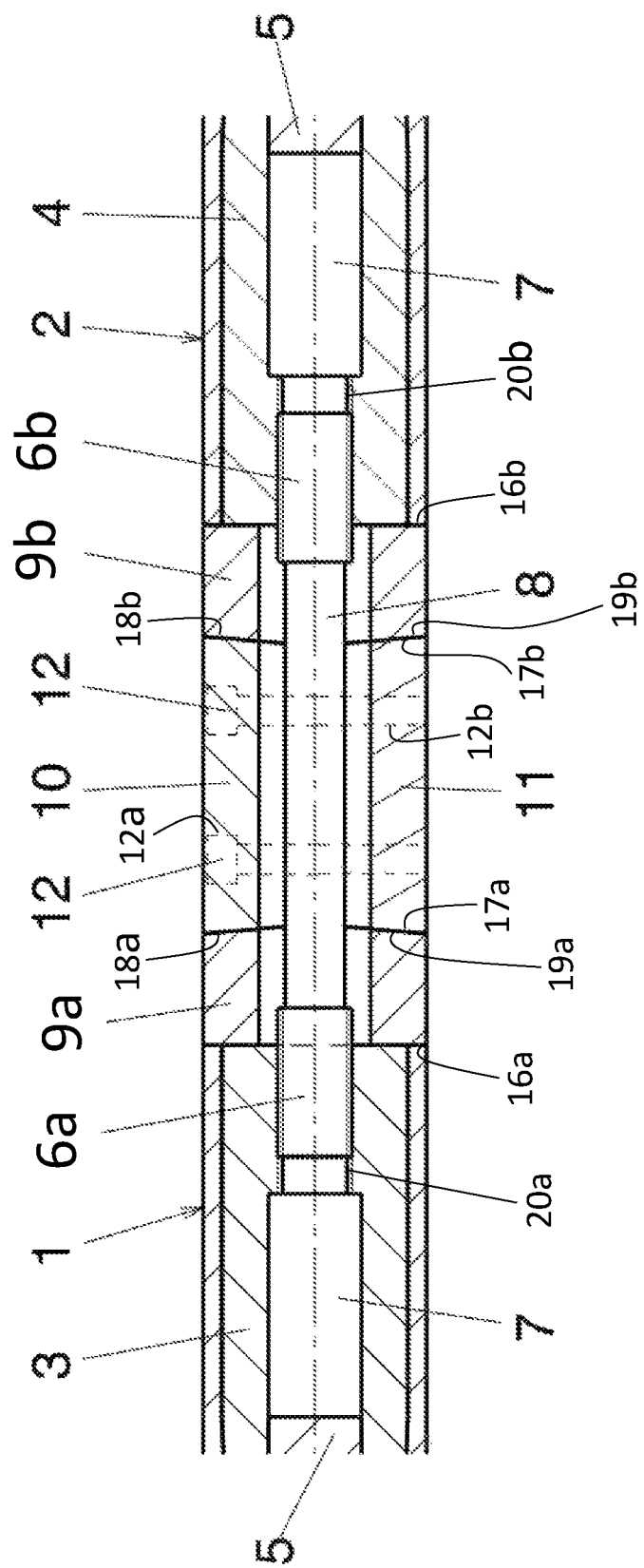
FIG. 3A is a cross section view of the single joint device shown in FIG. 2.
Figure 3B:
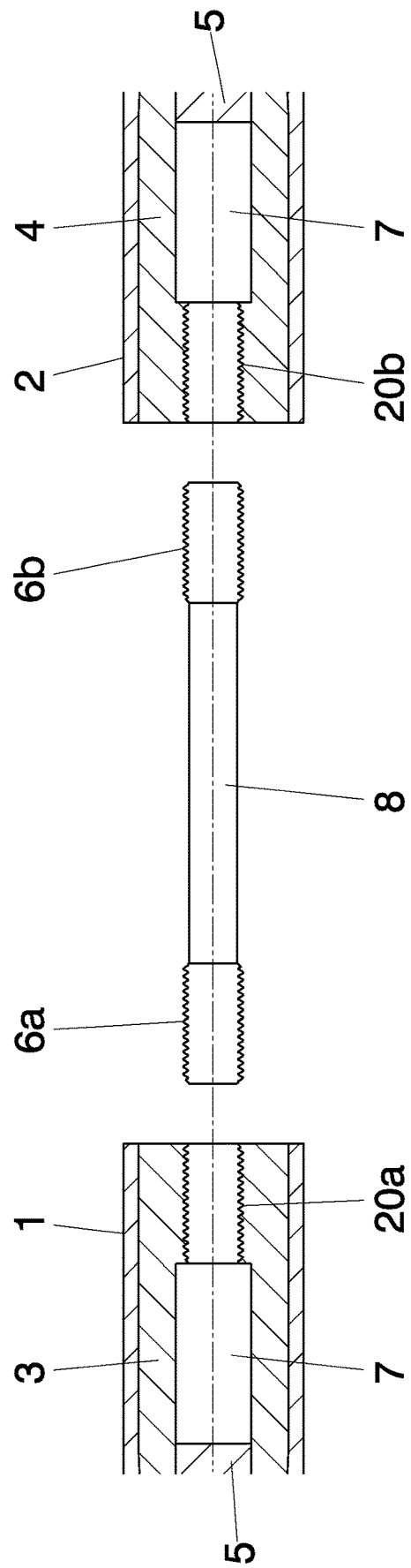
FIG. 3B is another cross section view of the single joint device shown in FIG. 2 showing more clearly the threaded areas of the bolt and inserts.

As shown in FIGS. 3A and 3B, the first insert 3 has a threaded part 20a and an unthreaded hollow area 7a, and the second insert 4 has a threaded part 20b and an unthreaded hollow area 7b. The bolt 8 has a first threaded end portion 6a and an opposite second threaded end portion 6b. According to one embodiment, during assembly, the bolt 8 is initially rotated in a first direction to cause the threaded part 6a to be threaded into the threaded part 20a of the first insert 3, passing through the threaded part 20a and penetrating the hollow area 7a. Thereafter the bolt 8 is rotated in a second direction opposite the first direction to cause the threaded part 6b to be threaded into the threaded part 20b of the second insert 4. According to one embodiment, prior to the bolt 8 being affixed to the second insert 4, the lateral caps 9a and 9b are disposed about the bolt 8. Thereafter, the upper and lower wedges 10 and 11 are fitted between the lateral caps 9a and 9b and coupled with the transverse bolts 12.

Figure 4A:
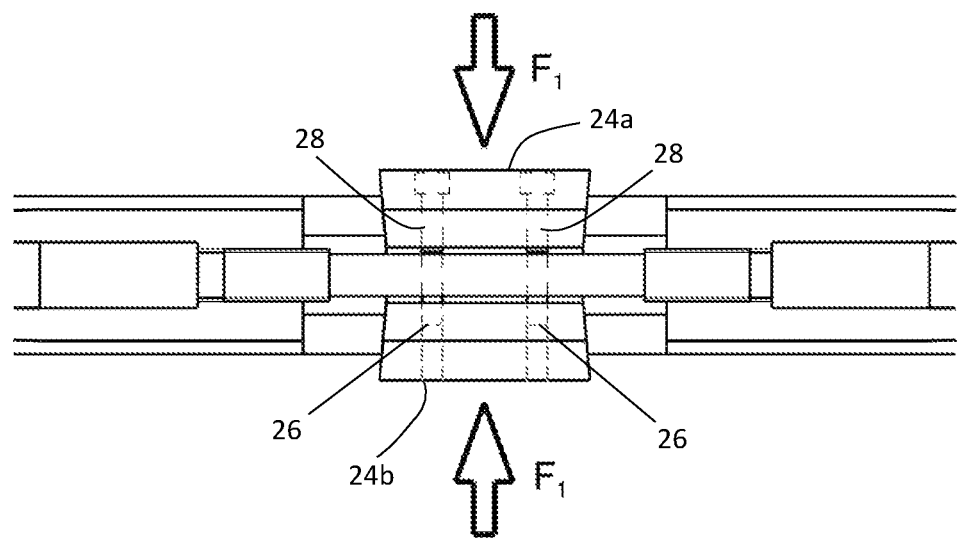
FIGS. 4A and 4B are sectioned views of the single joint device of FIG. 3A that show a conversion of vertical forces F1 applied to the wedges into horizontal forces F2 applied to the bolt that is attached to the primary and secondary inserts.
Figure 4B:
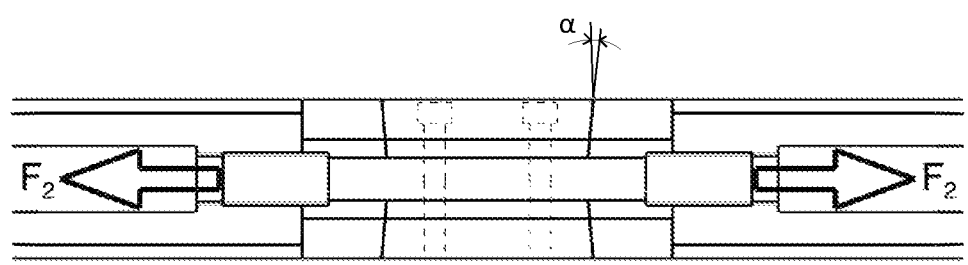

FIGS. 4A and 4B show how when a force F1 is applied to the upper and lower wedges 10 and 11 by use of the transverse bolts 12, the wedges transform the vertical force into two opposing horizontal forces F2 that cause the single bolt 8 to be stressed. The angle of the inclined surfaces 18a, 18b, 19a and 19b of the wedges 10 and 11 determine the ratio between the applied force F1 and the resulting horizontal forces F2. According to some embodiments the angle $\alpha$ of the inclined surfaces is greater than 0° and less than or equal to 15°. According to one implementation the angle $\alpha$ is 5°.

Figure 5:
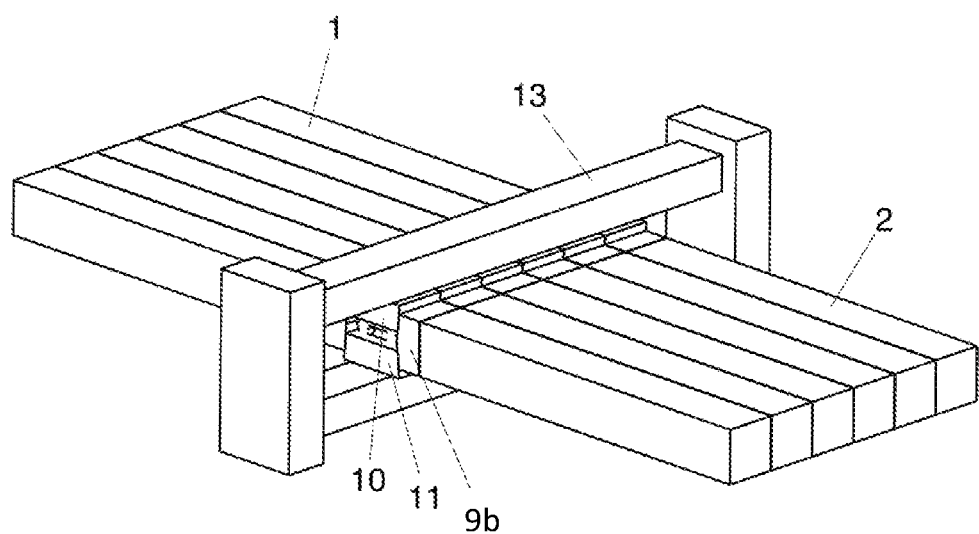
FIG. 5 is a general perspective view of a clamping apparatus that is configured to apply vertical forces to the wedges of a joint system that couples together modules of a wind turbine blade.

According to some embodiments the forces applied to the upper and lower wedges 10 and 11 are provided a torqueing of the transverse bolts 12. According to another embodiment, the forces applied to the upper and lower wedges 10 and 11 are provided by hydraulic or mechanical equipment 13 that directly applies a force to the exterior surfaces 24a and 24b of the wedges. The hydraulic or mechanical equipment may be configured to individually act on a set of upper and lower wedges or to act on all of the wedges at the same time as shown in FIG. 5. According to one embodiment the upper and lower wedges and the parts on which they act (e.g. lateral caps 9a, 9b, first and second inserts 3 and 4) are configured such that the upper and lower wedges maintain their position after having been forced inwardly toward one another by the mechanical equipment 13. According to such an embodiment, the upper and lower wedges 10 and 11 may thereafter be joined together by transverse bolts 12 as discussed above after the mechanical equipment 13 is removed from making contact with the upper and lower wedges.

FIG. 5 shows a system that is configured to apply transverse forces simultaneously on the upper and lower wedges 10 and 11 using a single action system, for example a hydraulic operated system comprising upper and lower elongate mechanical elements 13 that contact the upper and lower wedges 10 and 11 to bring them closer to each other.

In the embodiment of FIGS. 2 and 3A and 3B, at least two transverse bolts 12 pass through the upper and lower wedges 10 and 11. According to another embodiment four transverse bolts 12 pass through the upper and lower wedges. As discussed in more detail below, the heads 12a of the transverse bolts 12 are inserted into the upper wedge 10. According to some embodiments the transverse bolts 12 extend to the lower wedge without passing completely through it.

According to one embodiment the transverse bolts 12 each comprise a head 12a and a threaded shank 12b. The lower wedge 11 comprises a number of threaded apertures 26 that are configured to receive the threaded shanks 12b of the transverse bolts 12. The upper wedge 10 comprises a plurality of through openings 28 through which the transverse bolts 12 are introduced, the through openings 28 being respectively vertically aligned with the threaded apertures 26 of the lower wedge 11. The upper wedge 10 includes recesses formed in the exterior surface 24a in which the heads 12a of the transverse bolts reside so that they do not protrude from the exterior surface. When inserted into the through openings 28 of the upper wedge 10 and the threaded apertures 26 of the lower wedge 11, a rotation of the transverse bolts 12 results in the upper and lower wedges to be drawn together to produce the vertically applied forces F1.

According to some embodiments the transverse bolts 12 comprise self-locking threads to mechanically lock the transverse bolts in position. The use of an adhesive may also be used to mechanically lock the transverse bolts in position.

In the preceding description the first and second lateral caps 9a and 9b are disclosed as being elements separate to the first and second inserts 3 and 4. In other embodiments the lateral caps 9a and 9b respectively form a unitary part of the first insert 3 and second insert 4 so that the wedges 10 and 11 operate directly on the first and second inserts.

One or more or all of the first insert, second insert, upper wedge, lower wedge, first lateral cap and second lateral cap may be made of a metal.

The following clauses disclose in an unlimited way additional implementations, with each clause representing an implementation.

Clause 1: Device for joining a modular blade, the joint being formed by a plurality of bolts positioned between the two modules 1 and 2, where each bolt 8 is threaded between two inserts 3 and 4 housed in the modules 1 and 2, the joint being formed by lateral caps 9, an upper wedge 10, a lower wedge 11 and transverse screws 12 that traverse both wedges, all of which are made of a metal, surrounding the corresponding bolt 8 and positioned inside the hole that exists between the two modules 1 and 2, one face of the lateral cap 9 being in contact with the inserts 3 and 4 and the other in contact with the upper 10 and lower 11 wedges so that when a force F1 is applied to the wedges 10 and 11, the movement between the wedges 10 and 11 and the caps 9 generates a force F2 that separates the modules 1 and 2 and stresses the bolt 8.

Clause 2: Device for joining a modular blade according to clause 1, wherein the wedge has an angle of inclination between greater than 0° and less than or equal to 15°, preferably 5°.

Clause 3: Device for joining a modular blade according to clause 1, the force F1 is applied to a single system that acts simultaneously on all the wedges.

Clause 4: Device for joining a modular blade according to clause 1, wherein the force F1 is applied by the threading of at least two transverse bolts 12, preferably four.

Clause 5: Device for joining a modular blade according to clause 1, wherein the heads of the transverse bolts 12 are maintained below the surface of the upper wedge 10 and their bodies do not pass through the bottom of the lower wedge 11.

Clause 6: Device for joining a modular blade according to clause 1, wherein each of the lateral caps are comprised of a single part.

What is claimed is:

1. A wind turbine blade comprising:
   a first module;
   a second module;
   a first insert located in the first module, the first insert including a first threaded part;
   a second insert located in the second module, the second insert including a second threaded part;
   a bolt having a first threaded portion threaded with the first threaded part and a second threaded portion threaded with the second threaded part, the bolt having a longitudinal axis;
   a wedge assembly located at least in part in a gap between the first and second modules, the wedge assembly including an upper wedge and a lower wedge, the upper wedge having a first slanted side surface facing the first insert and a second slanted side surface facing the second insert, the lower wedge having a first slanted side surface facing the first insert and a second slanted side surface facing the second insert, the upper and lower wedges being urged toward one another by an applied force causing the first slanted side surface of each of the upper and lower wedges to press against a surface of the first insert to longitudinally stress the bolt in a first direction, and to cause the second slanted side surface of each of the upper and lower wedges to press against a surface of the second insert to longitudinally stress the bolt in a second direction opposite the first direction;
   the applied force to the upper and lower wedges being provided by one or more transverse bolts that join the upper and lower wedges, each of the one or more transverse bolts comprising a head and a threaded shank, the head residing inside an opening in the upper wedge, the threaded shank being in threaded engagement with a threaded aperture inside the lower wedge;
   the upper wedge including an exterior surface that faces in a first direction that is orthogonal to the longitudinal axis of the bolt and the lower wedge includes an exterior surface that faces in a second direction that is orthogonal to the longitudinal axis of the bolt, the second direction being opposite the first direction, no portion of the one or more transverse bolts protrudes from either of the exterior surfaces of the upper and lower wedges.

2. The wind turbine blade according to claim 1, wherein the first slanted side surfaces of the upper and lower wedges and the second slanted side surfaces of the upper and lower wedges are at an angle greater than 0 degrees and less than or equal to 15 degrees.

3. The wind turbine blade according to claim 1, wherein the first and second inserts and the upper and lower wedges are made of a metal.

4. A wind turbine blade comprising:
   a first module;
   a second module;
   a first insert located in the first module, the first insert including a first threaded part;
   a second insert located in the second module, the second insert including a second threaded part;
   a bolt having a first threaded portion threaded with the first threaded part and a second threaded portion threaded with the second threaded part, the bolt having a longitudinal axis;
   a wedge assembly located at least in part in a gap between the first and second modules, the wedge assembly including an upper wedge and a lower wedge, the upper wedge having a first slanted side surface facing the first insert and a second slanted side surface facing the second insert, the lower wedge having a first slanted side surface facing the first insert and a second slanted side surface facing the second insert, the upper and lower wedges being urged toward one another by an applied force causing the first slanted side surface of each of the upper and lower wedges to press against a surface of the first insert to longitudinally stress the bolt in a first direction, and to cause the second slanted side surface of each of the upper and lower wedges to press against a surface of the second insert to longitudinally stress the bolt in a second direction opposite the first direction;
   the wind turbine blade comprising multiple pairs of first and second inserts, the wedge assembly including a plurality of pairs of upper and lower wedges, each of the pairs of upper and lower wedges corresponding to a pair of the first and second inserts, forces orthogonal to the longitudinal axis of the bolt being applied simultaneously to the upper and lower wedges by a first longitudinal mechanical element acting on the upper wedges and a second longitudinal mechanical element acting on the lower wedges.

5. The wind turbine blade according to claim 4, wherein the first slanted side surfaces of the upper and lower wedges and the second slanted side surfaces of the upper and lower wedges are at an angle greater than 0 degrees and less than or equal to 15 degrees.

6. A wind turbine blade comprising:
   a first module;
   a second module;
   a first insert located in the first module, the first insert including a first threaded part;
   a second insert located in the second module, the second insert including a second threaded part;
   a bolt having a first threaded portion threaded with the first threaded part and a second threaded portion threaded with the second threaded part, the bolt having a longitudinal axis;
   a wedge assembly located at least in part in a gap between the first and second modules, the wedge assembly including an upper wedge, a lower wedge, a first lateral cap located on a first side of the upper and lower wedges and a second lateral cap located on a second side of the upper and lower wedges, the second side being opposite the first side, the upper wedge having a first slanted side surface facing the first insert and a second slanted side surface facing the second insert, the lower wedge having a first slanted side surface facing the first insert and a second slanted side surface facing the second insert, the first lateral cap including a first face that abuts the first insert and a second face opposite the first face that abuts the first slanted side surfaces of the upper and lower wedges, the second lateral cap including a first face that abuts the second insert and a second face opposite the first face that abuts the second slanted side surfaces of the upper and lower wedges, the upper and lower wedges being urged toward one another by an applied force causing the first slanted side surface of each of the upper and lower wedges to press against the second face of the first lateral cap to impose a force on the first insert that longitudinally stresses the bolt in a first direction, and to cause the second slanted side surface of each of the upper and lower wedges to press against the second face of the second lateral cap to impose a force on the second insert that longitudinally stresses the bolt in a second direction opposite the first direction;

the applied force to the upper and lower wedges being provided by one or more transverse bolts that join the upper and lower wedges, each of the one or more transverse bolts comprises a head and a threaded shank, the head residing inside an opening in the upper wedge, the threaded shank being in threaded engagement with a threaded aperture inside the lower wedge;

the upper wedge including an exterior surface that faces in a first direction that is orthogonal to the longitudinal axis of the bolt and the lower wedge includes an exterior surface that faces in a second direction that is orthogonal to the longitudinal axis of the bolt, the second direction being opposite the first direction, no portion of the one or more transverse bolts protrudes from either of the exterior surfaces of the upper and lower wedges.

7. The wind turbine blade according to claim 6, wherein the first lateral cap comprises a part that is separate from the first insert and the second lateral cap comprises a part that is separate from the second insert.

8. The wind turbine blade according to claim 6, wherein first slanted side surfaces of the upper and lower wedges and the second slanted side surfaces of the upper and lower wedges are at an angle greater than 0 degrees and less than or equal to 15 degrees.

9. The wind turbine blade according to claim 6, wherein the first and second inserts, the first and second lateral caps and the upper and lower wedges are made of a metal.

10. The wind turbine blade according to claim 6 comprising multiple pairs of first and second inserts, the wedge assembly including a plurality of pairs of upper and lower wedges corresponding to a pair of the first and second inserts, forces orthogonal to the longitudinal axis of the bolt being applied simultaneously to the upper and lower wedges by a first longitudinal mechanical element acting on the upper wedges and a second longitudinal mechanical element acting on the lower wedges.

11. The wind turbine blade according to claim 1 comprising multiple pairs of first and second inserts, the wedge assembly including a plurality of pairs of upper and lower wedges corresponding to a pair of the first and second inserts, forces orthogonal to the longitudinal axis of the bolt being applied simultaneously to the plurality of wedges by a single longitudinal mechanical element.

* * * * *